US008185613B2

(12) United States Patent
Xie et al.

(10) Patent No.: US 8,185,613 B2
(45) Date of Patent: May 22, 2012

(54) HOST ACCOUNTABILITY USING UNRELIABLE IDENTIFIERS

(75) Inventors: Yinglian Xie, Cupertino, CA (US); Fang Yu, Sunnyvale, CA (US); Martin Abadi, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 12/479,882

(22) Filed: Jun. 8, 2009

(65) Prior Publication Data

US 2010/0312877 A1    Dec. 9, 2010

(51) Int. Cl.
*G06F 17/30*    (2006.01)
(52) U.S. Cl. ........... 709/220; 709/224; 709/227; 726/23
(58) Field of Classification Search ................... 709/220, 709/223, 227; 726/23
See application file for complete search history.

(56) References Cited

U.S. PATENT DOCUMENTS

| | | | |
|---|---|---|---|
| 5,680,530 A * | 10/1997 | Selfridge et al. | 345/440 |
| 6,151,607 A * | 11/2000 | Lomet | 1/1 |
| 7,134,012 B2 | 11/2006 | Doyle et al. | |
| 7,336,968 B2 | 2/2008 | Diroo et al. | |
| 7,492,302 B2 * | 2/2009 | Poulton | 341/156 |
| 7,523,485 B1 | 4/2009 | Kwan | |
| 7,603,442 B2 * | 10/2009 | Sen | 709/220 |
| 7,624,448 B2 * | 11/2009 | Coffman | 726/23 |
| 2006/0184690 A1 | 8/2006 | Milliken | |
| 2008/0244739 A1 | 10/2008 | Liu et al. | |
| 2008/0244744 A1 | 10/2008 | Thomas et al. | |
| 2010/0094767 A1 * | 4/2010 | Miltonberger | 705/325 |

OTHER PUBLICATIONS

Simon, et al., "AS-Based Accountability as a Cost-effective DDoS Defense", retrieved at <<http://www.usenix.org/event/hotbots07/tech/full_papers/simon/simon.pdf>>, pp. 10.

Andersen, et al., "Holding the Internet Accountable", retrieved at <<http://lib.tkk.fi/Diss/2008/isbn9789512295609/article2.pdf>>, Proceedings of the 6th ACM SIGCOMM Workshop on Hot Topics in Networks (HotNets-VI). Atlanta, GA, USA. Nov. 14-15, 2007, pp. 1-7.

Kuptsov, et al., "SAVAH: Source Address Validation with Host Identity Protocol", retrieved at <<http://www.asiafi.net/meeting/2009-winter/presentation/Student%20Session%202/Dmitriy%20Kuptsov.pdf>> Jan. 14, 2009, pp. 17.

Sardana, et al., "Detection and Honeypot Based Redirection to Counter DDoS Attacks in ISP Domain", retrieved at <<ftp://ftp.computer.org/press/outgoing/proceedings/ias07/Data/2876a191.pdf>>, 2007, IEEE, pp. 6.

(Continued)

*Primary Examiner* — Khanh Dinh
(74) *Attorney, Agent, or Firm* — Microsoft Corporation (57) ABSTRACT

An IP (Internet Protocol) address is a directly observable identifier of host network traffic in the Internet and a host's IP address can dynamically change. Analysis of traffic (e.g., network activity or application request) logs may be performed and a host tracking graph may be generated that shows hosts and their bindings to IP addresses over time. A host tracking graph may be used to determine host accountability. To generate a host tracking graph, a host is represented. Host representations may be application-dependent. In an implementation, application-level identifiers (IDs) such as user email IDs, messenger login IDs, social network IDs, or cookies may be used. Each identifier may be associated with a human user. These unreliable IDs can be used to track the activity of the corresponding hosts.

14 Claims, 6 Drawing Sheets

OTHER PUBLICATIONS

Park, et al., "On the Effectiveness of Probabilistic Packet Marking for IP Traceback under Denial of Service Attack", retrieved at <<http://www.cs.purdue.edu/nsl/ppm-infocom01.pdf>>, pp. 10.

Andersen, et al., "Accountable Internet Protocol (AIP)", Retrieved at <<http://www.cs.cmu.edu/~dga/papers/aip-sigcomm2008.pdf>>, SIGCOMM'08, Aug. 17-22, 2008, pp. 12.

Anderson, et al., "Spamscatter: Characterizing Internet Scam Hosting Infrastructure", Retrieved at <<http://www.cse.ucsd.edu/~voelker/pubs/spamscatter-security07.pdf>>, pp. 14.

Bellovin, et al., "ICMP Traceback Messages", Retrieved at <<http://www.ietf.org/proceedings/03mar/I-D/draft-ietf-itrace-04.txt>>, Feb. 2003, pp. 18.

Blum, et al., "Detection of Interactive Stepping Stones: Algorithms and Confidence Bounds", Retrieved at <<http://www.cs.berkeley.edu/~dawnsong/papers/stepstone.pdf>>, pp. 20.

Burch, et al., "Tracing Anonymous Packets to their Approximate Source", Retrieved at <<http://209.85.229.132/search?q=cache:qNp4e54URU4J:www.usenix.org/event/lisa2000/burch/burch.ps+Tracing+Anonymous+Packets+to+their+Approximate+Source&cd=3&hl=en&ct=clnk&gl=in>>, 2000 LISA XIV—Dec. 3-8, 2000, pp. 16.

Casado, et al., "Peering through the Shroud: The Effect of Edge Opacity on IP-Based Client Identification", Retrieved at <<http://www.cs.princeton.edu/~mfreed/docs/illum-nsdi07.pdf>>, pp. 14.

Chiang, et al., "A Case Study of the Rustock Rootkit and Spam Bot", Retrieved at <<http://www.usenix.org/event/hotbots07/tech/full_papers/chiang/chiang.pdf>>, pp. 8.

Donoho, et al., "Multiscale Stepping-Stone Detection: Detecting Pairs of Jittered Interactive Streams by Exploiting Maximum Tolerable Delay", Retrieved at <<http://citeseerx.ist.psu.edu/viewdoc/download;jsessionid=F1C3454991C2B86BCCC65B197ECAAF11?doi=10.1.1.15.3099&rep=rep1&type=pdf>>, pp. 1-15.

Droms, R., "Dynamic Host Configuration Protocol", Retrieved at <<http://www.ietf.org/rfc/rfc2131.txt>>, Mar. 1997, pp. 43.

Ferguson, et al., "Network Ingress Filtering: Defeating Denial of Service Attacks which Employ IP Source Address Spoofing", Retrieved at <<http://www.ietf.org/rfc/rfc2827.txt>>, May 2000, pp. 10.

Gu, et al., "Botminer: Clustering Analysis of Network Traffic for Protocol—and Structure-Independent Botnet Detection", Retrieved at <<http://faculty.cs.tamu.edu/guofei/paper/Gu_Security08_BotMiner.pdf>>, pp. 16.

Gu, et al., "Botsniffer: Detecting Botnet Command and Control Channels in Network Traffic", Retrieved at <<http://faculty.cs.tamu.edu/guofei/paper/Gu_NDSS08_botSniffer.pdf>>, pp. 18.

Holz, et al., "Measurements and Mitigation of Peer-to-Peer-Based Botnets: A Case Study on Storm Worm", Retrieved at <<http://honeyblog.org/junkyard/paper/storm-leet08.pdf>>, pp. 9.

Killalea, T., "Internet Service Provider Security Services and Procedures", Retrieved at <<http://www.isi.edu/in-notes/rfc3013.txt>>, Nov. 2000, pp. 13.

Kohno, et al., "Remote Physical Device Fingerprinting", Retrieved at <<http://www.caida.org/publications/papers/2005/fingerprinting/KohnoBroidoClaffy05-devicefingerprinting.pdf>>, pp. 15.

Lampson, Butler, "Computer Security in the Real World", Retrieved at <<http://www.usenix.org/events/sec05/tech/lampson.pdf>>, Aug. 2005, pp. 1-26.

Li, et al., "Large-Scale IP Traceback in High-Speed Internet: Practical Techniques and Theoretical Foundation", Retrieved at <<http://www.cc.gatech.edu/~jx/reprints/IEEESP04.pdf>>, pp. 15.

Liu, et al., "Passport: Secure and Adoptable Source Authentication", Retrieved at <<http://www.cs.duke.edu/~xwy/publications/passport-draft.pdf>>, pp. 1-14.

"Nmap Free Security Scanner", Retrieved at <<http://www.insecure.org/nmap/>>, May 6, 2009, pp. 2.

"Project Details for p0f", Retrieved at <<http://freshmeat.net/projects/p0f/>>, pp. 4.

Ramachandran, et al., "Understanding the Network-Level Behavior of Spammers", Retrieved at <<http://www.cc.gatech.edu/~avr/publications/p396-ramachandran-sigcomm06.pdf>>, SIGCOMM'06, Sep. 11-16, 2006, pp. 12.

Ramachandran, et al., "Revealing Botnet Membership using DNSBL Counter-Intelligence", Retrieved at <<http://www.cc.gatech.edu/~feamster/publications/dnsbl.pdf>>, pp. 6.

Ramachandran, et al., "Filtering Spam with Behavioral Blacklisting", Retrieved at <<http://www.cc.gatech.edu/~feamster/papers/bb-ccs2007.pdf>>, CCS'07, Oct. 29-Nov. 2, 2007, pp. 10.

"Route Views Project", Retrieved at <<http://www.routeviews.org>>, May 4, 2009, pp. 4.

Savage, et al., "Practical Network Support for IP Traceback", Retrieved at <<http://www.eecg.toronto.edu/~ashvin/courses/ece1746/2003/reading/savage-sigcomm00.pdf>>, SIGCOMM'00, pp. 12.

Snoeren, et al., "Hash-Based IP Traceback", Retrieved at <<http://www.ccert.edu.cn/upload/4/30.pdf>>, SIGCOMM'01, Aug. 27-31, 2001, pp. 3-14.

"Spamhaus Policy Block List (PBL)", Retrieved at <<http://www.spamhaus.org/pbl/>>, May 6, 2009, p. 1.

Reed, et al., "Anonymous Connections and Onion Routing", Retrieved at <<http://www.onion-router.net/Publications/JSAC-1998.pdf>>, pp. 1-15.

"Trojan Now uses Hotmail, Gmail as Spam Hosts", Retrieved at <<http://news.bitdefender.com/NW544-en--Trojan-Now-Uses-Hotmail-Gmail-as-Spam-Hosts.html.>>, Aug. 8, 2007, pp. 2.

Wang, et al., "Robust Correlation of Encrypted Attack Traffic through Stepping Stones by Manipulation of Inter-Packet Delays", Retrieved at <<http://cs.gmu.edu/~xwangc/Publications/CCS2003-IPDWMCorr.pdf>>, CCS'03, Oct. 27-30, 2003, pp. 10.

Xie, et al., "How Dynamic are IP Addresses", Retrieved at <<http://ccr.sigcomm.org/drupal/files/fp179-xie.pdf>>, SIGCOMM'07, Aug. 27-31, 2007, pp. 12.

Xie, et al., "Spamming Botnets: Signatures and Characteristics", Retrieved at <<http://ccr.sigcomm.org/online/files/p171-xie.pdf>>, SIGCOMM'08, Aug. 17-22, 2008, pp. 171-182.

Zhang, et al., "Detecting Stepping Stones", Retrieved at <<http://www.cs.jhu.edu/~fabian/courses/CS600.424/course_papers/Stepping-Stones.pdf>>, pp. 1-11.

Zhuang, et al., "Characterizing Botnets from Email Spam Records", Retrieved at <<http://www.usenix.org/event/leet08/tech/full_papers/zhuang/zhuang.pdf>>, pp. 9.

* cited by examiner

HOST ACCOUNTABILITY USING UNRELIABLE IDENTIFIERS

BACKGROUND

The Internet, a network of distributed computers and computerized devices, is designed to be open and anonymous. By obtaining an IP (Internet Protocol) address, a host can easily connect to the Internet and freely talk to other hosts without exposing its real identity. This open and anonymous architecture, which enabled the Internet to expand quickly, is also a source of security concerns. Attackers can easily hide their real identities behind IP addresses.

Dynamic IP address assignment poses challenges to the commonly used IP-based approach to detect, blacklist, and block malicious traffic. When an attacker changes its IP address, legitimate activities that subsequently use the old IP address will be misclassified as bad, while malicious activities from the new IP address will slip through. The numerous NAT (network address translation) devices and HTTP (Hypertext Transfer Protocol) proxies also imply that blacklisting can result in denial of service to many legitimate clients that share IP addresses with attackers.

A botnet is a term generally used to refer to a collection of compromised computers (called "zombie computers" or "bots.") which serve as hosts to running malicious software ("malware"), under a common command and control infrastructure. Generally, a botnet proliferates over a network autonomously and automatically, and the botnet's originator can control the group remotely, typically for nefarious purposes. The Internet is extremely dynamic, and this dynamicity is exploited by botnets which constantly relocate within an IP address space without actually migrating to another computer.

The transient nature of the attacks and the dynamics of IP address assignment make it difficult to pinpoint the exact compromised host entities as their IP addresses change.

Security rests on host accountability, which is the ability to identify the hosts responsible for traffic, which is typically the basis for punishing misbehavior. It is commonly believed that today's Internet architecture provides no host accountability and that architectural changes are necessary in order to support it.

Host accountability in the Internet has long been a topic of substantial interest. A large body of previous work has focused on providing source accountability to identify the true network origin of traffic. In this area, a few early efforts have proposed solutions to detect stepping stone attacks by packet timing analysis and content analysis. Source address spoofing is also commonly leveraged to hide attacker identities, especially in DoS (denial of service) attacks. Ingress and egress filtering, which have been partially deployed, can prevent source-address spoofing. Other proposed approaches also require changes to the existing routers or the routing Infrastructure. Among them, IP-traceback techniques were proposed to determine the source(s) of packets received by storing additional states at routers or marking packets along their paths.

Several clean slate solutions have been proposed to provide accountability, thus eliminating the problems created by dynamic IP NATs and proxies. For example, to offer host accountability as a security property, Accountable Internet Protocol (AIP) changes the IP layer by using self-certifying addresses to ensure that hosts and domains can prove their identities without relying upon a global trusted authority. Although these proposals are attractive, they are difficult to deploy.

SUMMARY

An IP (Internet Protocol) address is a directly observable Identifier of hosts in the Internet and a host's IP address can dynamically change. Analysis of traffic (e.g., network activity or application request) logs may be performed and a host tracking graph may be generated that shows hosts and their bindings to IP addresses over time. A host tracking graph may be used to determine host accountability. To generate a host tracking graph, a host is represented by identifiers. These identifiers may be application-dependent.

In an implementation, application-level identifiers (IDs) such as user email IDs, messenger login IDs, social network IDs, or cookies may be used. Each identifier may be associated with a human user. These unreliable IDs can be used to track the activity of the corresponding hosts.

In an implementation, a probabilistic estimated model may be used to initialize tracked ID groups by grouping together user IDs that are correlated in their login patterns. A host tracking graph may be generated using current estimations. An iterative refinement process may be used to update the estimated model until it converges.

In an implementation, inconsistent bindings may include conflict bindings and concurrent bindings. The inconsistent bindings may be resolved or removed by identifying proxy hosts and guest events.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
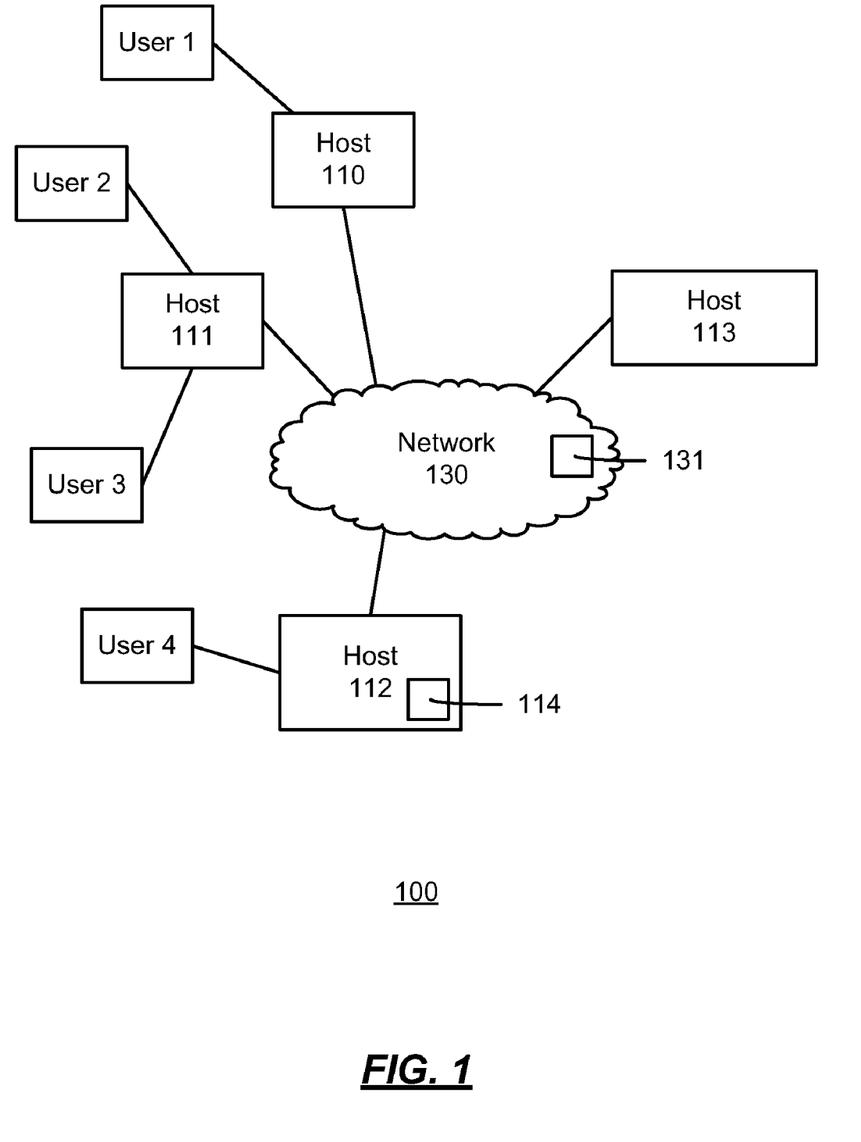
FIG. 1 illustrates an exemplary environment.

FIG. 1 illustrates an exemplary environment 100 that includes host computers 110, 111, 112, 113) connected to a network 130, for example, the Internet, a wide area network (WAN) or local area network (LAN). The network 130 provides access to services such as the World Wide Web (the "Web") 131. The Web 131 allows one host (e.g., 112) to access documents containing text-based or multimedia content contained in Web pages, data, documents, and/or objects maintained and served by the one or several other hosts (e.g., 110, 111, 112, 113). Typically, this is done with an application 114 (e.g., a browser application program, a network-enabled application program, an email client application, a file transfer client, etc.) executing in the host.

The technology infrastructure of the Web 131 may include server-software, content-syndication, messaging protocols, standards-based browsers with plugins and extensions, and various client applications. These differing, yet complementary approaches provide the Web 131 with a growing set of information storage, creation, and dissemination capabilities.

Users 1, 2, 3, and 4 are shown in FIG. 1 and may use host 110, 111, 112, 113 (e.g., by logging in to one or more of the hosts 110, 111, 112, 113) to access content on, or interact with, one or more of other hosts, as described further herein. Although only four users and four hosts are shown in FIG. 1, any number of users and hosts may be implemented and used with respect to aspects and embodiments described herein.

An IP address is a directly observable Identifier of hosts in the Internet and a host's IP address can dynamically change. As described further herein, a posteriori analysis of traffic (e.g., network activity or application request) logs may be performed and a host tracking graph may be generated that shows hosts and their bindings to IP addresses over time. A host tracking graph may be used to determine host accountability.

Figure 2:
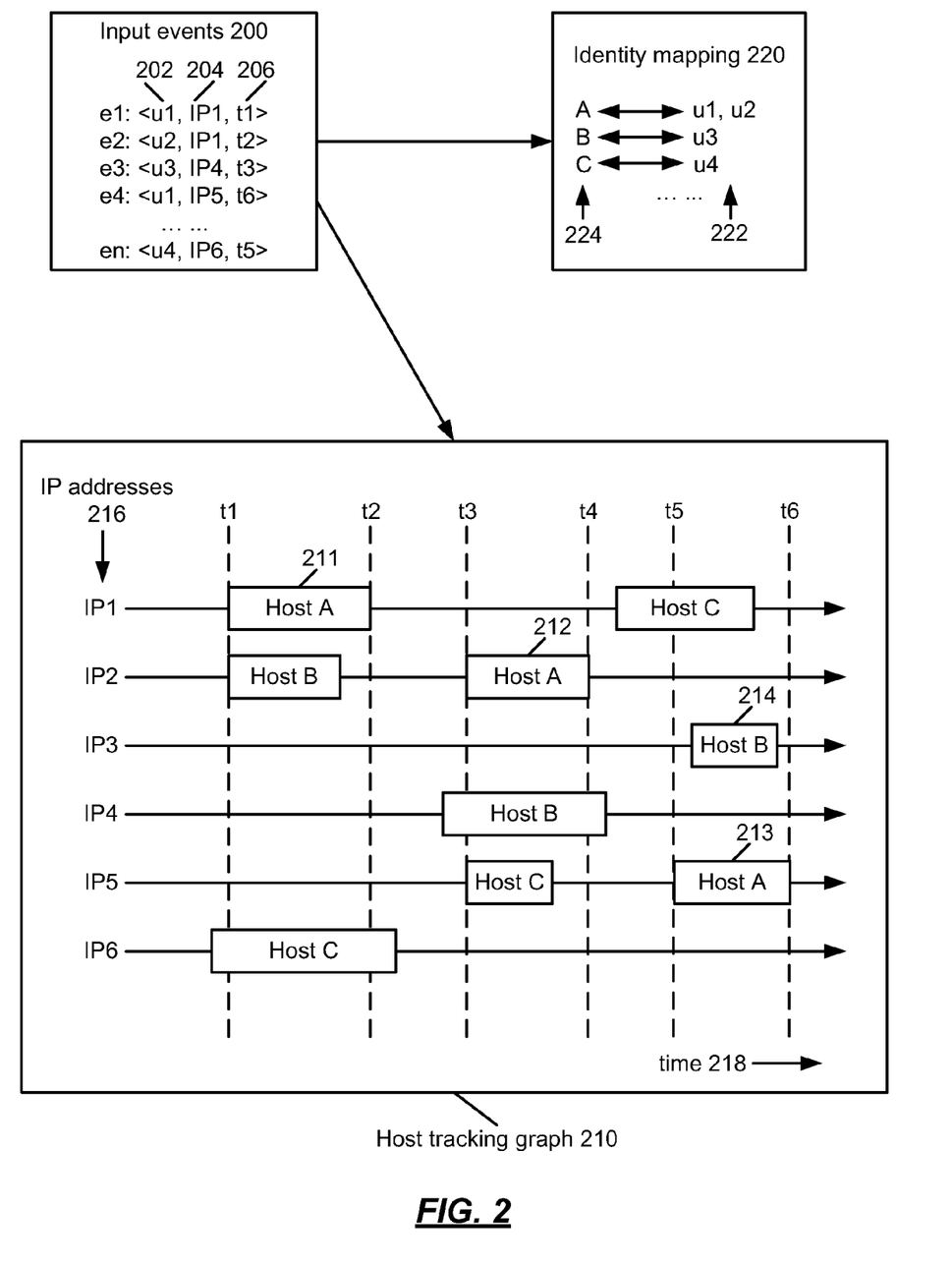
FIG. 2 illustrates an example host tracking graph with input events and an identity mapping.

FIG. 2 illustrates an example host tracking graph 210 with input events 200 and an identity mapping 220 involving three different hosts A, B, and C. Time advances from left to right, with each rectangle box representing the binding between a host and an IP address across a time range. In this example, host A was bound to IP address IP1 during time range [t1,t2] as shown by box 211. Later, host A moved to IP2 and IP5 during time ranges [t3,t4] and [t5,t6], respectively, as shown by boxes 212 and 213. The time range during which a host is bound to an IP address may be defined as a binding window. For example, the binding window from host A to IP1 is [t1,t2].

Host accountability may be determined using a host tracking graph. In an implementation, for any network traffic originating from an IP address IPi at time tj, if there exists a binding window that includes tj from a host H to IPi, then the host H may be held accountable for such traffic. In an implementation, if host H is known to have bound to a different IP address IPk at tj, then it may be concluded that host H is not responsible for generating any traffic from IPi at time tj. Note that the bindings from an IP address to various hosts may not be continuous, since hosts may not be up all the time and there may also exist unassigned IP addresses. For example, there are no hosts bound to address IP3 before time t5 in the host tracking graph 210 of FIG. 2, as shown by box 214.

To generate a host tracking graph, a host is represented by identifiers. Host representations may be application-dependent. In an implementation, application-level identifiers (IDs) such as user email IDs, messenger login IDs, social network IDs, or cookies may be used. Each such identifier is typically associated with a human user, such as users 1, 2, 3, or 4 of FIG. 1. These unreliable IDs can be used to track the activity of the corresponding end-host activities. For example, a browser cookie appearing in requests from different IP addresses and different timestamps may suggest that the corresponding host has connected to the Internet at different times with different Dynamic Host Configuration Protocol (DHCP) IP addresses. Identifiers may also be anonymized versions of user IDs. In such a case, for example, each login address or ID may be replaced with a unique distinct number as its identifier.

Using application-level IDs to represent hosts is unreliable. Often, one user and hence one host may be associated with multiple application IDs. Furthermore, users can keep signing up new IDs, and a group of hosts can also share an ID if they are controlled by a common user. Reliable host entities may be derived using unreliable application IDs, and a host tracking graph may be generated.

As shown in FIG. 2, the input events 200 may comprise a sequence of network or application activity events e1, e2, . . . , en over time. In an implementation, each event may comprise three fields: a unique unreliable ID (represented by ui 202), an IP address (represented by IPi 204), and the timestamp when the ID is observed being associated with the corresponding IP address (represented by ti 206). Taking a set of events (e.g., the input events 200) as input, two outputs may be generated: an identity mapping table (e.g., the identity mapping 220) that represents the mappings from unreliable IDs to reliable host entities (e.g., unreliable IDs 222 to reliable hosts 224), and a host tracking graph that tracks each host's activity across different IP addresses over time (e.g., the host tracking graph 210 showing activities on IP addresses 216 over time 218).

Figure 5:
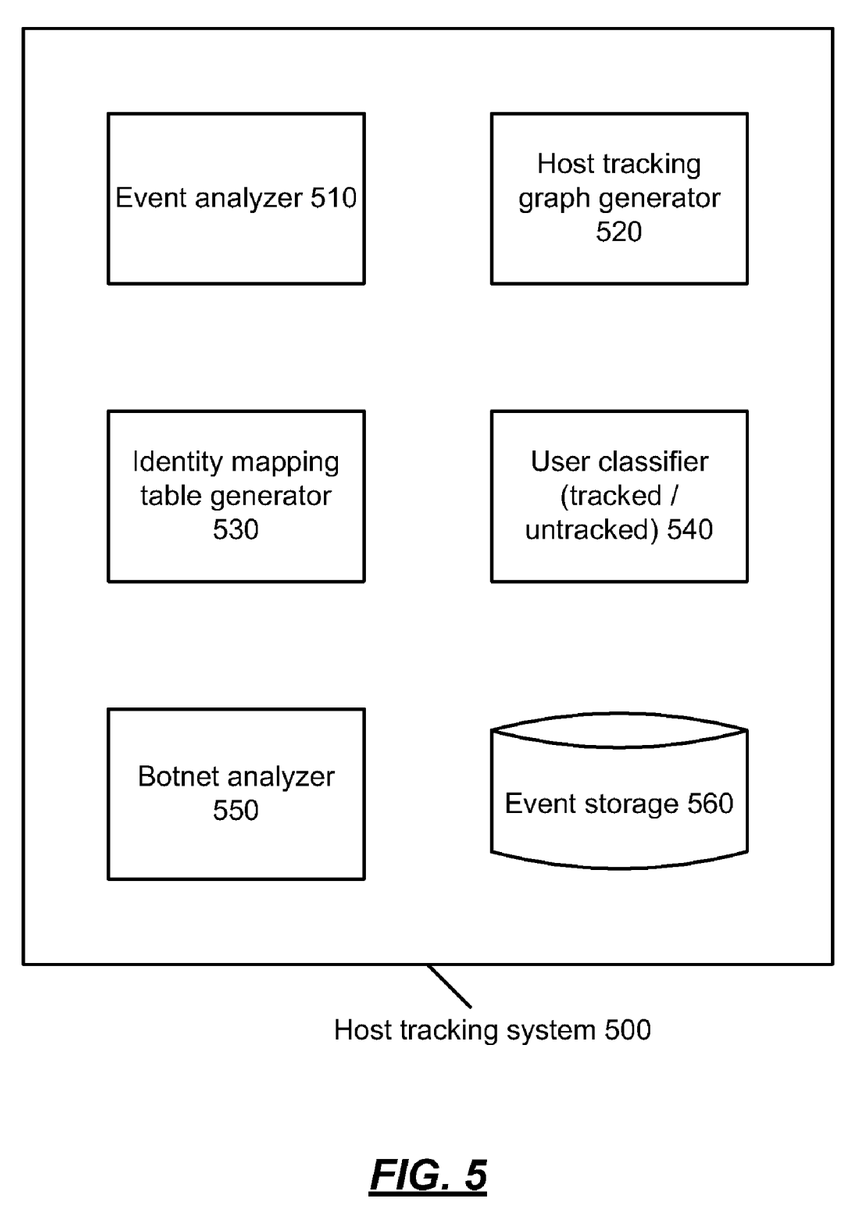
FIG. 5 is a block diagram of an implementation of a system that may be used to determine host accountability using a host tracking graph.

To represent a host, a host tracking system (an implementation of which is described further with respect to FIG. 5) may adopt the group of user IDs that is associated with a host to serve as a virtual ID for the host in order to keep track of the related activities. Stable, non-proxy users may be useful for this purpose, and are referred to as tracked user IDs. Ephemeral users or proxy-only user IDs may not help establish host IP binding changes and are called untracked user IDs. Tracked events refer to the set of events that can be eventually attributed to certain responsible host entities in the host tracking graph, and the rest of the events are untracked events. In an implementation, a goal is to maximize the number of tracked events while ensuring that the tracking is accurate.

Untracked users who travel frequently (i.e., log in from different IP addresses or IP address ranges) may be more suspicious and may likely be botnet created accounts. For example, it has been found that for users who logged in from at least about 10 IP ranges, for the tracked user IDs, despite the fact that they logged in from a large number of IP address ranges, the majority of the users sent only one email throughout the entire month. However, for the untracked users, the number of emails sent was about 20 emails per user. The strong correlations of the email sending statistics may be due to coordinated botnet activities.

Figure 3:
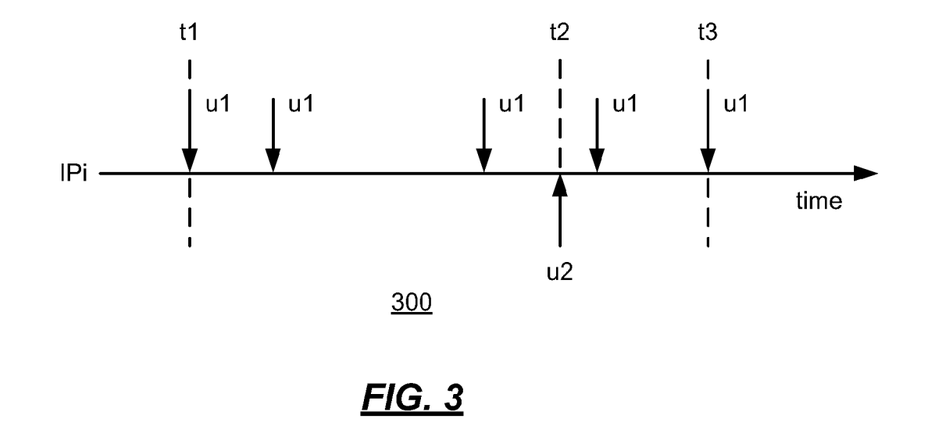
FIG. 3 illustrates an example set of input events.

Without prior knowledge of which subset of user IDs are tracked, the identity mapping 220 may be regarded as a hidden model to be estimated. As described further herein, the estimations may be iteratively updated so that the Identity mapping 220 fits the actual observation of the activity events from the input data. For example, assume that each user ID is a tracked user ID that maps to a unique host. FIG. 3 illustrates an example set of input events (an example input of six user login events) shown on a timeline 300. The input events are represented as vertical arrows from user u1 and u2 at IP address IPi. As shown, user u1 logged in five times from time t1 to time t3 and user u2 logged in at the same IP address at time t2.

IP address assignment in a large IP range is typically either random or static. In the random address assignment case, the probability of a host obtaining the same IP address in two different connections in a network range is usually very small. Therefore, it is highly likely that the host corresponding to user u1 is bound to IP address IPi throughout the duration between times t1 and t3, including time t2. However, under the assumption that each user uniquely maps to a different host, there exists another host corresponding to user u2, which also binds to the same IP address IPi at time t2.

Naive one-to-one identity mappings thus lead to two events that are inconsistent with each other, suggesting that the identity mapping table should be re-estimated. To do so, three possibilities may be considered: (1) multiple user IDs share a host, and in this case users u1 and u2 both map to one common host (e.g., either created by one human user or used by different family members), (2) IP address IPi is a proxy box associated with multiple host entities behind it, and (3) user u2 is a guest user (e.g., either a real guest account or introduced by an attacker) to the host associated with user u1. The three cases may be differentiated and the number of events that are eventually tracked may be maximized with as few inconsistent events as possible.

Figure 4:
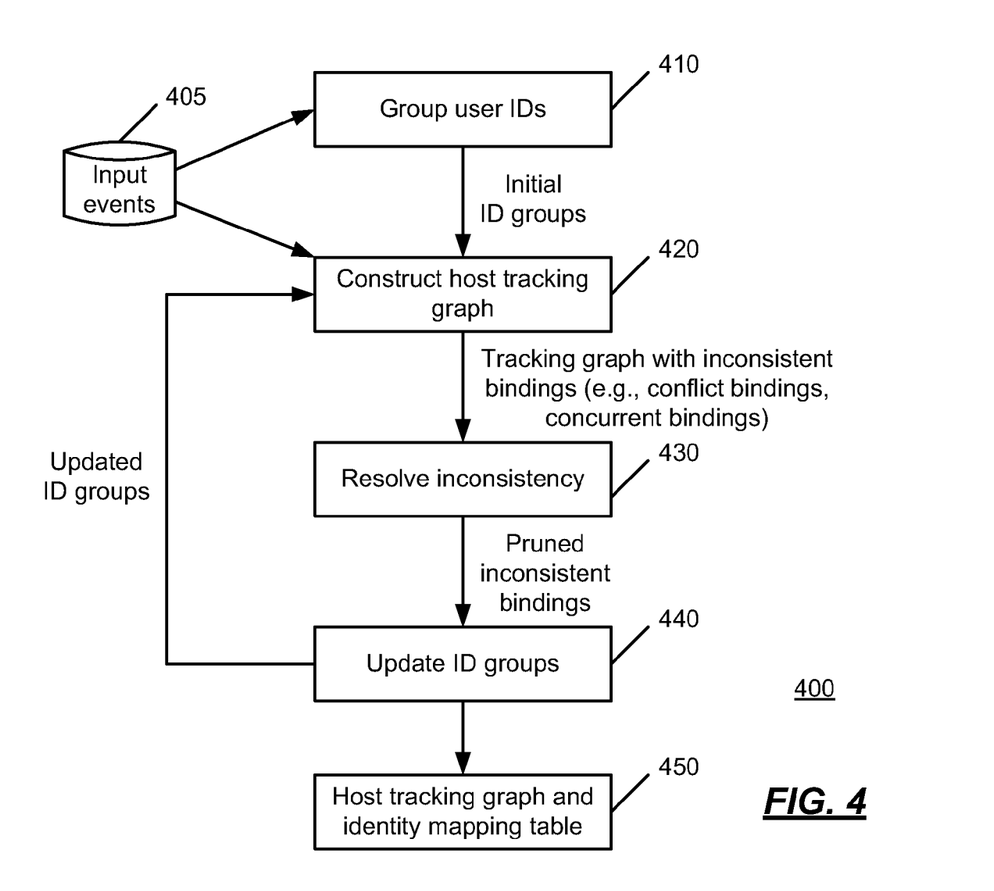
FIG. 4 is an operational flow of an implementation of a method of determining a host tracking graph.

FIG. 4 is an operational flow of an implementation of a method 400 of determining a host tracking graph using a host tracking system. The host tracking system maintains a set of user ID groups and initially each user ID is assumed to be tracked. At 410, input events 405 may be obtained from storage and some user IDs pertaining to the input events may be grouped. In an implementation, a probabilistic estimated model may be used to initialize tracked ID groups by grouping together user IDs that are correlated in their login patterns.

With respect to application ID grouping, to derive host IP bindings using application IDs (e.g., user IDs), an initial set of ID groups may be determined so that each group, with high probability, is associated with one common host. In an implementation, a probabilistic model may be used to compute the probability of users belonging to one host based on their login statistics.

If a group of users all logged in from one host, their login events will show strong correlations, e.g., appearing next to each other in time at a similar set of IP addresses. For example, if user u1 logged in ten times at ten different IP addresses, and user u2 logged in nine times, and among these login events, user u1 and user u2 appeared together eight times at eight different IP addresses, then they are very likely to share one host.

However, by random IP address assignment, two irrelevant users might also appear together in time if they happened to have connected to the Internet consecutively at a common IP address. In particular, in the case of proxy, two different users that repeatedly use a common proxy (proxies may have dynamic IP addresses) might also have a large number of nearby login events.

To quantitatively determine the probability of two Independent user IDs appearing together, each host's connection (hence the corresponding user login) to the network may be taken to be a random independent event. Given a sequence of login events from a user u1, the number of times another user u2 logged in right before or after user u1 follows a binomial distribution. Specifically, let n1 denote the number of neighboring login slots to user u1, then the probability of user u2 appearing k or more times in these slots can be approximated using Equation (1):

$$P(u1, u2) = 1 - \sum_{i=0}^{k-1} Cn_1^i p2^i (1-p2)^{(n_1-i)}$$ Equation (1)

Here, $Cn_1^i$ is the binomial coefficient, representing the number of i-combinations (each of size i) from a set of n1 elements. p2 is the probability of user u2 logging in. With a total of c login events and a total of c2 login events from u2, p2 may be approximated as shown by Equation (2):

$$p2 = \frac{c2}{c}$$ Equation (2)

A very small P(u1,u2) means there is very little chance for user u1 and user u2 to log in consecutively to each other k times if they are independent, suggesting that users u1 and u2 might be correlated instead. In an implementation, this correlation test may be performed for all pairs of users that log in next to each other at least twice, and may select a pair (u1,u2) as a correlated user ID pair if P(u1,u2) is smaller than a predetermined threshold.

For example, if user u2 logged in 30 times out of 230 total logins, then p2=0.13. In this case, if users u1 and u2 logged in together five times out of a total of n1=38 neighboring slots for user u1, then the probability of them appearing together in a random assignment is as high as 0.09. The two users may not be grouped in this case. In an implementation, the probability threshold may be set to 0.05, but the threshold can be more systematically tuned based on the login event patterns from each IP range. Once the pairs of correlated users have been identified, they may be grouped. If user ID pair (u1,u2) and (u2,u3) are both correlated pairs, then the three users may be grouped into a correlated user set {u1,u2,u3}. This process may continue until there are no more groups that can be further expanded. At this stage, each set of expanded ID groups are potentially tracked. For the remaining user IDs that cannot be grouped, each user may be regarded as a tracked group if the user has logged in at least twice throughout the input duration. Both sets are merged together for further analysis. In the next operations, the set may be iteratively pruned and updated.

At 420, a host tracking graph may be constructed using the current estimations. In an implementation, each application ID group obtained from operation 410 may be regarded as a candidate host identifier. A host tracking graph may be constructed using these ID groups as follows.

For each group U, the first timestamp t1 and the last timestamp t2 that any, user from group U logged in at IP address IPi are identified and used to define the binding window w=[t1, t2] from group U to IP address IPi. The binding is determined as G(U,w)=IPi. Formally, in an implementation, a host tracking graph may be defined as G: H×T→IP, where H is the space of all hosts on the Internet, T is the space of time, and IP is the IP address space. For example, If host h∈H is bound to IP address IP1∈IP at time t∈T, this binding may be represented as G(h,t)=IP1. Similarly, G(h,w)=IP1 when G(h,t)=IP1 for all t∈w.

Inconsistent bindings may then be determined. There are two types of inconsistent bindings: conflict bindings and concurrent bindings. A conflict binding occurs when two user groups concurrently use the same IP address. For example, for any two bindings G(U1,w1)=IPi and G(U2,w2)=IPi, where w1=[t1,t2] and w2=[t3,t4], if time t3≦time t2 and time t1≦time t4, the overlapped time range between w1 and w2 may be determined to be w. Both G(U1,w)=IPi and G(U2,w)=IPi may then be identified as conflict bindings.

A concurrent binding occurs when a user group concurrently uses two different IP addresses. For example, for two bindings G(U1,w1)=IPi where w1=[t1,t2], and G(U1,w2)=IPj where w2=[t3,t4], if IPi≠IPj and w1 and w2 overlap, then similar to the conflict binding case, the overlapped time range w may be determined, and both G(U1,w)=IPi and G(U1,w)=IPj may be identified as concurrent bindings.

At 430, inconsistent bindings may be resolved (i.e., removed). Inconsistent bindings can be caused by the existence of NATs or proxies, guest login events from untracked IDs, or an incorrect grouping, for example.

Proxy identification can be used to resolve conflict bindings. Because large NATs or proxies allow hosts to concurrently access the Internet, they will generate a large number of conflict bindings. Depending on the network configurations, proxies or NATs can be set up to use either static or dynamic IP addresses. For example, a DSL-based Internet cafe may change its IP addresses from time to time.

To find both types of proxies and NATs, the overlapped conflict binding windows associated with a common IP address may be gradually expanded. Such expansion obtains a maximum continuous conflict window with a large number of conflict bindings. For example, if G(U1,w1)=IPi and G(U2,w2)=IPi, and the conflict windows w1 and w2 overlap with each other, then the two windows may be merged into an expanded conflict window.

For each expanded conflict window, a degree of event concurrency may be determined. A conflict window may be selected as a proxy binding window if the rate of new user arrivals is greater than α (new users/time) and the rate of conflict bindings is higher than β (conflict bindings/time), where in an Implementation, α is set to 1 new user per 5 minutes and β is set to 1 conflict binding per 30 minutes, though α and β may be set to other values depending on the implementation.

After a proxy binding window is identified, the events occurring during the window may be determined to be proxy events. Proxy events may be treated as tracked events, with the corresponding proxy box as their traffic origin in the Internet. In practice, this can significantly reduce the number of conflict bindings (e.g., reduce the number of conflict bindings by more than 90%).

A tracked user group and an untracked user group may concurrently appear at a same IP address, resulting in conflict bindings. In an implementation, in case (1) the untracked user login is a guest login event, and in this case the tracked user group represents the correct host, in case (2) the untracked group and the tracked group share a host, but they were not grouped previously due to the infrequent logins from the untracked users, or in case (3) the tracked user login is a guest event.

Events from the untracked group may be treated as guest events to resolve the conflict. This is because in both cases (1) and (2) the guest login events from the untracked group will be correctly attributed to the host corresponding to the tracked group. In practice, case (3) seems to be rare.

Overall, guest event conflict bindings typically are only a small fraction of the total inconsistent events. However, their responsible host entities may be identified because a large number of malicious events may appear as guest events on compromised tracked hosts.

In an implementation, splitting groups may be used to resolve concurrent bindings. A user ID group having a large number of concurrent bindings suggests that the initial grouping operation might be overly aggressive in grouping IDs together from different hosts. For each group that had more than one concurrent binding, the grouping may be adjusted by splitting the subset of IDs that triggered concurrent login events into a different ID group.

At 440, ID groupings may be updated and the updated ID groups may be fed back into the host tracking graph construction process at 420 in an iterative way, until the estimated model converges (e.g., the ID groupings cannot be reduced or updated further). The final output is a host tracking graph 450 with a corresponding identity mapping table.

More particularly, with the knowledge of proxies, guest events, and the split groups, the initial identity mappings may be re-estimated by pruning the groups that became untracked. The proxy-only users or guest-only users are now untracked.

It is noted that the order of the pruned users may affect the final set of remaining tracked IDs. If a tracked user is incorrectly identified as a guest untracked user, then its events are regarded as untracked. To maximize the number of tracked events, only proxy groups are pruned initially, in an implementation. The remaining groups may then be iteratively refined using the above-described operations. In practice, for most IP ranges, the number of tracked groups converges after about four to six iterations.

At this point, for the remaining inconsistent bindings, the events may be discarded from these inconsistent bindings and treated as untracked events.

For the tracked bindings, their actual binding windows may be much longer than the binding windows derived from login events only. So their window sizes may be expanded to increase the coverage. For example, for a host IP binding G(A[t1,t2])=IPi, its window expansion is subject to the constraints of it cannot expand beyond the boundaries of the previous and next binding windows of the same host, nor can it expand beyond the boundaries of the previous and next binding windows on the same IP address. Under the constraints, the binding window size may be increased by an amount of time (e.g., by 30 minutes, one hour, two hours, etc. both forward and backward in time).

The Identity mapping table and the host tracking graph may be outputted with expanded binding windows. The set of input events that can be attributed to certain hosts may be referred to as tracked events, and the remaining events may be referred to as untracked events. Correspondingly, the IDs that are used to represent hosts in the identity mapping table may be referred to as tracked IDs, and the group of IDs that all map to one unique host may be referred to as a tracked ID group.

In an implementation, users may travel and hence either move their hosts around (e.g., using laptops, handheld computing devices, etc.) or use different hosts (e.g., using office desktop computers vs. using home computers). A stable user usually has just a few (or one or two, for example) IP ranges where they access the Internet frequently, but may occasionally travel to other locations. Thus, although users may log in from many different network locations, it may be expected that a majority fraction of the normal user IDs will be classified as part of a tracked group at only one or two or a few IP address ranges.

The mobility of tracked users vs. untracked users may be compared. While it is plausible for a legitimate user to travel a lot and hence be associated with many different login IP ranges, those untracked users that also logged in from a large number of IP ranges are highly suspicious. These transient and distributed user IDs are highly characteristic of botnet attacks and may be suspected to be email spamming accounts signed up by botnet attackers, for example.

The host tracking results provide information for network security. The information regarding malicious host population behind an IP range is useful for online applications such as video streaming and gaming services for detecting DoS attacks. Previously, it has been difficult to estimate the number of compromised hosts solely by IP address due to the dynamic IP effect. For example, even if there is only one bad host in a range, it can change IP addresses and use different user IDs every day, thus appearing to be many active hosts.

With host tracking results, the number of malicious hosts may be accurately determined using the information regarding the host IP bindings.

Figure 6:
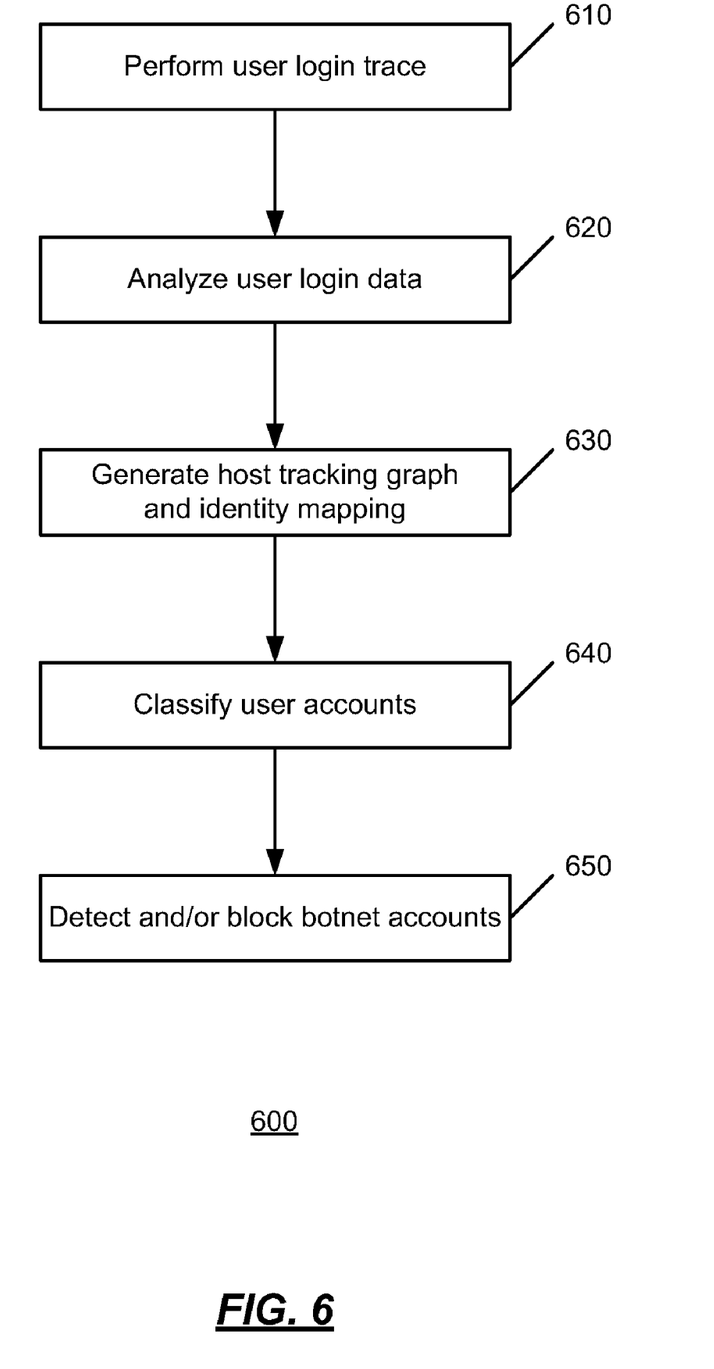
FIG. 6 is an operational flow of an implementation of a method of determining host accountability using host tracking.

FIG. 5 is a block diagram of an implementation of a system 500 that may be used to determine host accountability using a host tracking graph, and FIG. 6 is an operational flow of an implementation of a method 600 of determining host accountability using host tracking.

The host tracking system 500 may comprise a computing device or be comprised within a computing device (such as a computing device 700 described with respect to FIG. 7) and may comprise a memory or other storage such as event storage 560. In an implementation, user email IDs may be taken as application IDs and user login events may be the input events, e.g., which the host tracking system 500 obtains and stores in event storage 560. The host tracking system 500 may receive user login data from a service (e.g., an email service login data for a predetermined amount of time in the past, such as one month, two months, etc.) and store the user login data in the event storage 560. In an implementation, the host tracking system 500 may perform a user login trace at 610 to obtain a certain amount of login data (e.g., one month, two months, etc. of user login data from an email service).

At 620, the user login data may be analyzed using an event analyzer 510. The event analyzer 510 may analyze the IDs and/or events using techniques such as those described with respect to the method 400, for example.

The event analyzer 510 may provide its output to a host tracking graph generator 520 and an identity mapping table generator 530 which generate a host tracking graph and an identity mapping (mapping user IDs to hosts) such as those described above with respect to FIGS. 2 and 4, for example. Such generation may be performed at 630 using techniques described herein.

In an implementation, host tracking may be performed on an IP range-by-range basis, where the range information can be derived from the border gateway protocol (BGP) table prefixes or whois database entries, for example. Typically, the different bindings between normal user IDs and IP addresses within a range may originate from the same host. For user IDs that appear across multiple ranges, the different user ID IP bindings may also be triggered by user mobility rather than host mobility. Therefore, in an implementation, the host tracking system 500 may analyze events from each range independently.

At 640, each user account may be classified as being a tracked user account or an untracked user account. A user classifier 540 may be used to perform the techniques described above to output a set of tracked and untracked user accounts.

Such output may be used to detect and/or block botnet accounts and determine host accountability for such traffic and activity. In an implementation, untracked users may be associated with botnet activities. At 650, a botnet analyzer 550 may use the host tracking graph and the user account classification to detect and/or block botnet accounts and determine the hosts that are accountable using techniques described above.

Figure 7:
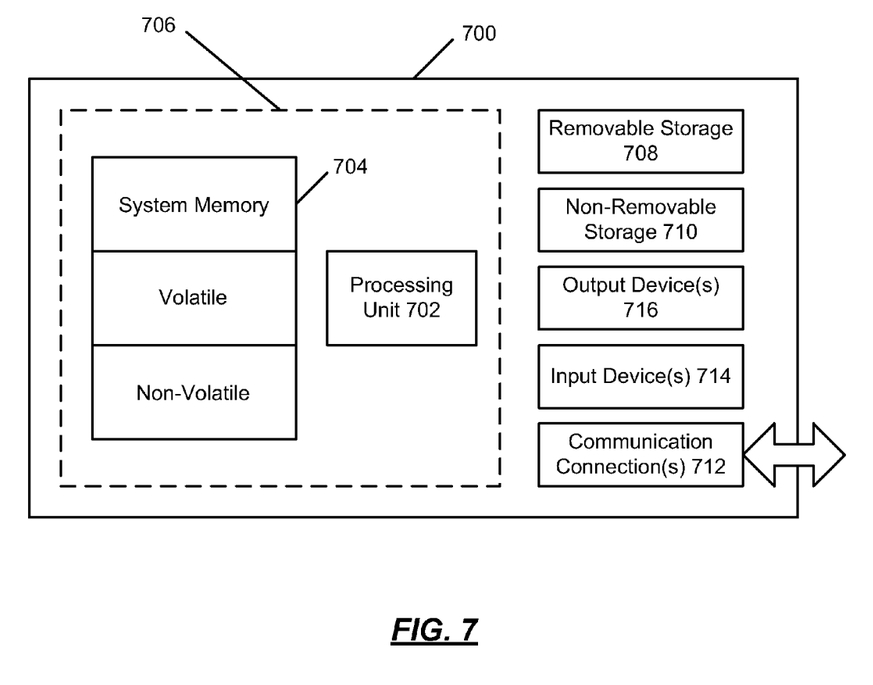
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700.

Computing device 700 depicts the components of a basic computer system providing the execution platform for certain software-based functionality in accordance with various embodiments. Computing device 700 can be an environment upon which the host tracking system 500 for determining a host tracking graph and performing host tracking from various embodiments is instantiated. Computing device 700 can include, for example, a desktop computer system, laptop computer system or server computer system. Similarly, computing device 700 can be implemented as a handheld device (e.g., cellphone, etc.) Computing device 700 typically includes at least some form of computer readable media. Computer readable media can be a number of different types of available media that can be accessed by computing device 700 and can include, but is not limited to, computer storage media.

In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A host accountability method, comprising:
grouping a plurality of identifiers into a plurality of identifier groups using a host tracking system comprising a computing device, each of the plurality of identifiers pertaining to a different event or a plurality of events;
constructing a host tracking graph with a host tracking graph generator of the host tracking system using the plurality of identifier groups, wherein the host tracking graph tracks activities of at least one host across different Internet protocol addresses over time;
resolving a plurality of inconsistencies from the host tracking graph using the host tracking system;
updating the plurality of identifier groups based on resolving the plurality of inconsistencies using the host tracking system; and
revising the host tracking graph with the host tracking graph generator using the plurality of updated identifier groups.

2. The method of claim 1, wherein the plurality of identifiers comprises user identifiers and each different event comprises a login event of a user or a plurality of users to a host or a plurality of hosts, wherein grouping the plurality of identifiers into the plurality of identifier groups comprises grouping the user identifiers using correlated login patterns.

3. The method of claim 2, wherein grouping the user identifiers using correlated login patterns comprises using a probabilistic model to determine a probability of the plurality of users belonging to one host using login statistics.

4. The method of claim 2, wherein the plurality of inconsistencies comprises a conflict binding corresponding to at least two of the identifier groups concurrently using the same Internet protocol address to connect to a network comprising the plurality of hosts.

5. The method of claim 2, wherein the plurality of inconsistencies comprises a concurrent binding corresponding to one of the plurality of identifier groups concurrently using different Internet protocol addresses to connect to a network comprising the plurality of hosts.

6. The method of claim 1, wherein resolving the plurality of inconsistencies from the host tracking graph comprises removing inconsistent events using an identification of at least one of a proxy host or a guest event.

7. The method of claim 1, wherein the plurality of identifiers comprises application-level identifiers, and the plurality of events comprises a sequence of network or application activity events over time.

8. The method of claim 7, wherein the plurality of identifiers comprises user email identifiers.

9. The method of claim 1, further comprising repeatedly performing resolving the plurality of inconsistencies, updating the plurality of identifier groups, and revising the host tracking graph using the plurality of updated identifier groups using an iterative process until the identifier groups cannot be updated further.

10. A host tracking system, comprising:
an identifier analyzer that groups a plurality of user identifiers into a plurality of identifier groups, each of the user identifiers pertaining to a different event of a plurality of events, and each different event comprising a user activity event of a user of a plurality of users to a host of a plurality of hosts; and
a host tracking graph generator that constructs a host tracking graph using the plurality of identifier groups, resolves a plurality of inconsistencies from the host tracking graph, updates the plurality of identifier groups based on resolving the plurality of inconsistencies, and revises the host tracking graph using the plurality of updated identifier groups, wherein the host tracking graph tracks activities of at least one host across different Internet protocol addresses over time.

11. The system of claim 10, further comprising an identity mapping table generator that generates an identity mapping of the user identifiers to the plurality of hosts using the events.

12. The system of claim 10, further comprising a user classifier that generates a user account classification comprising data related to each of the users as being tracked or untracked.

13. The system of claim 12, further comprising a botnet analyzer that infers botnet accounts using the host tracking graph and the user account classification.

14. The system of claim 13, wherein the botnet analyzer determines a host that is accountable for the botnet account using the host tracking graph.

* * * * *